March 21, 1939.  T. DIETRICH ET AL  2,151,086
REGISTERING MECHANISM
Filed Sept. 12, 1935   2 Sheets-Sheet 1
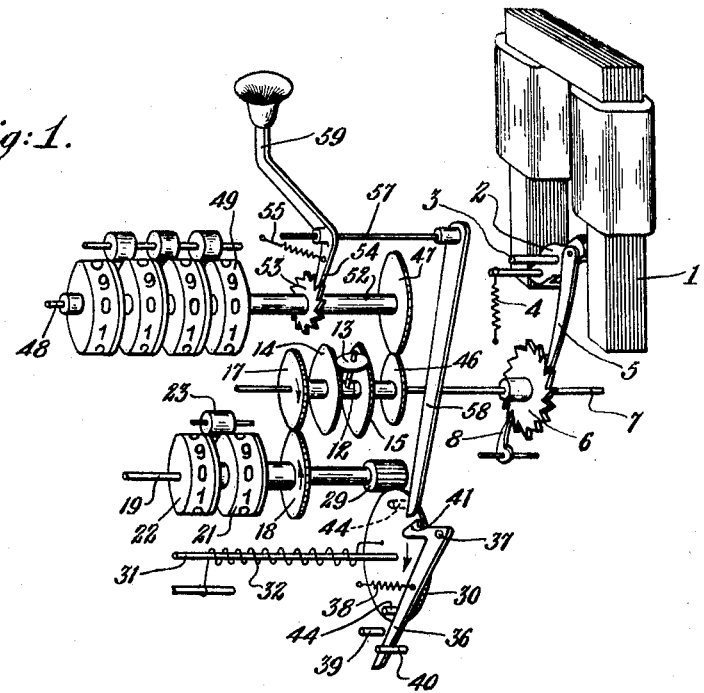
Fig:1.
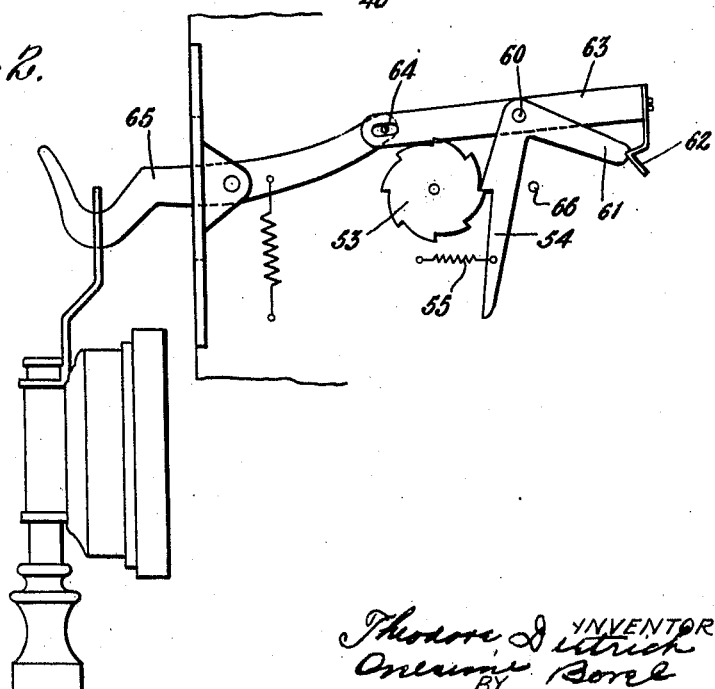
Fig:2.
INVENTOR
Theodore Dietrich
Onesime Bove
BY
Morgan Finnegan & Durham
ATTORNEYS.

March 21, 1939.    T. DIETRICH ET AL    2,151,086
REGISTERING MECHANISM
Filed Sept. 12, 1935    2 Sheets-Sheet 2

INVENTORS
Theodore Dietrich
Onesime Botel
BY
Morgan Finnegan & Durham
ATTORNEYS.

Patented Mar. 21, 1939

2,151,086

UNITED STATES PATENT OFFICE 2,151,086

REGISTERING MECHANISM

Théodore Dietrich and Onésime Borel, Geneva, Switzerland, assignors to Landis & Gyr, A-G., a corporation of Switzerland Application September 12, 1935, Serial No. 40,229
In Switzerland October 13, 1934

10 Claims. (Cl. 235—92)

The invention relates to new and useful improvements in registering mechanisms for telephone call charges, and in certain of its features more especially to such devices installed at or controlling subscribers' stations to indicate charges for particular or individual calls and also the total charges from a previous settlement or other initial point.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a perspective view, partly diagrammatic, of a mechanism embodying the invention;

Fig. 2 is a fragmentary view of one form of control mechanism for transferring charges from a call charge register to a total charge register;

Figure 4:
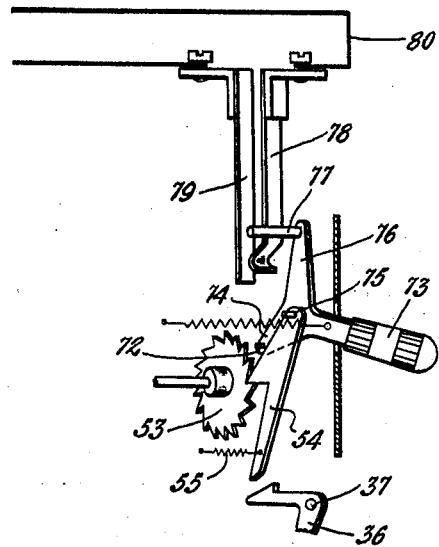
Fig. 4 is a fragmentary view of a manually operated mechanism for the same purpose and also controlling the impulse circuit.

The invention provides a novel and improved register for telephone service which is of simple, reliable and sturdy construction, and capacitated to indicate, register and transfer service charge data under various and different conditions and requirements. The invention provides at a subscriber's station registered indication of the charge for particular calls and like indication of the total charge from some initial point, such as a last preceding settlement, and provides also for transference of charges or values from a call charge register to a total charge register; such transference being effected automatically either at reaching a predetermined limit on the call charge register or after each call is made, or optionally, at the will of the subscriber through manually-operated means. The invention also provides adaptation of the mechanism and system to toll stations where an operator controls a plurality of telephone stations and collects from the users, the charges against individual users for particular calls being registered, and a total charge register being automatically maintained against the operator at the station.

In the present embodied form, broadly considered, the mechanism is electromagnetically operated on the same impulse current as the subscriber's register at the telephone exchange, the call charges being registered, and optionally accumulated up to a predetermined limit, on a first or call charge register through a gear train actuated and controlled by the impulse current circuit, the gear train serving also to transfer charge registrations or values from the first or call charge register to the total charge register. This function, together with the restoration of the first or call charge register to zero, is effected through a spring-tension mechanism put under tension by the operation of the device and released to effect the aforesaid functions either automatically or manually at will, as already described. It will be understood that the foregoing general description, and the following detailed description as well, are explanatory and exemplary of the invention, but are not restrictive thereof.

Referring now in detail to the embodiment of the invention illustrated by way of example in the accompanying drawings, the means for actuating and controlling the registering devices in timed relation with the charge register at the telephone exchange comprises an electromagnet 1 connected in circuit to receive the same current impulses as the aforesaid register at the exchange. The electromagnet 1 has an armature 2, pivotally mounted at 3, and acted upon by a retracting spring 4. Pivotally connected to the armature is a pawl 5 which meshes with a ratchet wheel 6, fixed on a rotatable shaft 7, a spring ratchet 8 acting on the wheel 6 to prevent backward movement.

Gear connections are provided for actuating a call charge or first register from the above-described actuating mechanism, and to transfer charges or values from the call charge register to a total charge register. In the present embodiment a planetary gear mechanism is provided to effect said actuation of the call charge register from the electromagnet 1 and ratchet wheel 6, the same planetary gear mechanism being likewise employed to transfer the charges from the call charge register to the total charge register. As so embodied, an arm 12 is fixed on shaft 7 to rotate therewith, a sun gear 13 being journaled loosely on arm 12, and being in mesh at either side, respectively, with planet gears 14 and 15, which are journaled loosely on shaft 7. Fixed to gear wheel 14 to rotate therewith is a gear 17, which meshes with a gear 18, journaled loosely on a shaft 19. Fixed to gear 18 to rotate therewith is the unit wheel 21 of the call charge register, the wheel 21 being connected to the next wheel 22 of the register in the usual manner, as by a pinion or other suitable device 23. The register wheels may represent any desired monetary values in the usual manner.

Referring now to the means for transferring charges from the call charge register to the total charge register and for restoring the call charge register to zero position, as exemplarily embodied a pinion 29 is fixed to rotate with the gear 18, the pinion meshing with a geared disc 30, loosely mounted on a shaft 31. A spring 32, coiled about shaft 31, is placed under tension as the disc 30 rotates during the accumulation of charges on the call charge register, the spring later acting to restore the call charge register to zero when the readings of that register are transferred to the total charge register. In operative relation with the disc 30 is a detent lever 36, pivoted at 37 and acted on by spring 38. The tail of lever 36 projects between pins 39 and 40, and its movement is limited thereby. At its other end lever 36 has a detent hook 41. Fixed in disc 30 is a pin 44 which cooperates with the lever 36 as hereinafter described.

Referring now to the connections between the two registers, a gear 46 is fixed to rotate with gear 15, and meshes with a gear 47 having a sleeve bearing 52 journaled on a shaft 48. Fixed on sleeve 52 to rotate with the gear 47 is the units wheel 49 of the total charge register. The connections between the wheel 49 and the remaining wheels of the total charge register may be of any usual or suitable form. Fixed also on the sleeve 52 so as to rotate with gear 47 and register wheel 49 is a detent ratchet wheel 53, and engaging therewith is a pivoted detent 54, acted on by a spring 55. The detent 54 may be released either automatically after the registration of the call charge mechanism has reached a predetermined limit or optionally through manual control, or automatically between successive calls, or manually by an attendant at a public telephone station where the operator has control of a group of telephones, as may best suit the particular conditions of operation. The automatic control is illustrated in Fig. 1, and as there embodied detent pawl 54 is fixed on a shaft 57, and fixed also on said shaft is an arm 58 adapted to cooperate with the detent lever 36. In Fig. 1 also a manually operated lever 59 is shown fixed to detent 54.

Referring now to the manner of operation of the hereinbefore described mechanism, as the electromagnet 1 is energized periodically on the exchange circuit in synchronism with the corresponding checking mechanism at the exchange, armature 2 is rocked, and ratchet wheel 6 is correspondingly advanced and arm 12 of the planetary therewith. As pinion 16 is held by ratchet 53 and detent 54, sun wheel 13 rolls on gear 15 and rotates gear 14 thereby advances the call charge register through gears 17 and 18. At the same time, through pinion 29, geared disc 30 is rotated, and pin 44 is advanced step by step from the full line position toward the broken line position shown in Fig. 1, the spring 32 meanwhile passing under tension. Pin 44 reaches the broken line position before the call charge register has reached the predetermined limit, and when the call charge register reaches this predetermined limit, pin 44 rocks arm 58 until it is caught and held by detent 41 of lever 36. This rocking motion carries detent 54 away from detent ratchet 53, and the gears 15, 46 and 47 are now free to rotate, and spring 32 unwinds to restore disc 30 to initial position. Under the unwinding action of spring 32, the call charge register is rotated back to zero position, and simultaneously through gears 18, 17, 14, 13, 15, 46 and 47 the charge on the first or call charge register is transferred to the total charge register. Pin 44 on reaching the full line position of Fig. 1 rocks lever 36 thereby releasing arm 58, and detent 54 again engages ratchet 53, and the mechanism is in the original position to again begin the registration of calls upon the call charge register. If desired, at any time, irrespective of the position of the mechanism, by actuating the lever 59 the charges accumulated on the first or call charge register may be transferred to the total charge register. If desired, suitable locking means may be provided to prevent release of the detent mechanism, thereby preventing unauthorized transference of charges from the call charge register to the total charge register. That is, by locking the detent lever 54, and turning the call charge register to zero, that register will show any charges incurred subsequent to the locking.

Figure 3:
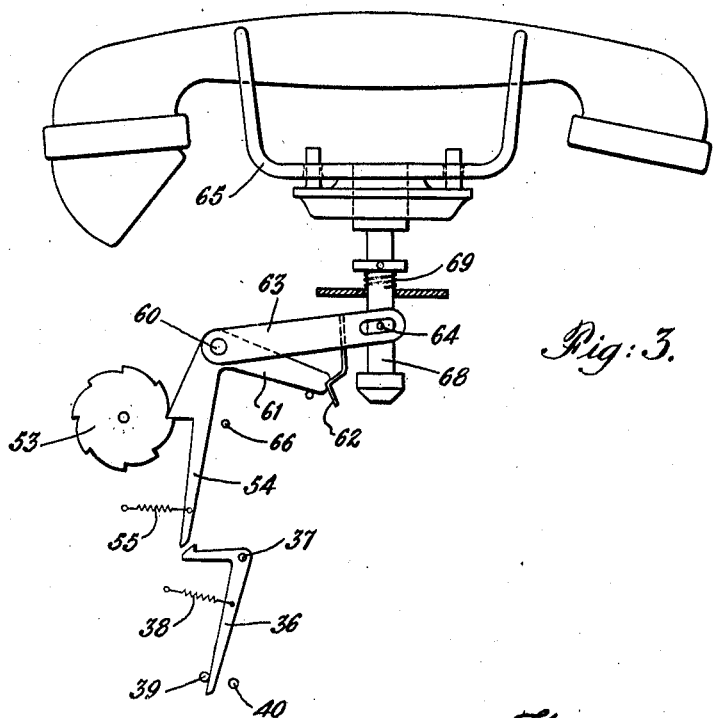
Fig. 3 is a fragmentary view showing another form of control mechanism for the same purpose as that in Fig. 2.

In Figs. 2 and 3 are shown illustratively two forms of mechanism for automatically transferring a previous charge or charges from the call charge register to the total charge register whenever the transmitter or receiver-transmitter is lifted from its support. In both these figures detent lever 54 is shown with an integral angled arm 61, having a notched end with which a V-spring 62 coacts, the V-spring being mounted on a lever 63, having a common pivot 60 with the detent lever. In Fig. 2 a lever 63 is shown having at its other end a pin and slot connection 64 with a pivoted and spring pressed hook 65, which supports the receiver of a wall set. In Fig. 3 a lever 63 has a pin and slot connection with the supporting stem 68 of a desk set, the support being acted on by spring 69. In either case when the transmitter or receiver-transmitter is lifted, detent lever 54 is swung out of detent ratchet 53, to permit the transfer of charges from the call register to the total register. The lever comes to rest against a stop pin 66, and the spring 62 will snap out of its notch, to permit detent lever 54 to engage ratchet 53 as soon as the call charge register has been restored to zero and the charge has been transferred to the total charge meter.

If it be desired to dispense with any mechanical connection with the telephone apparatus of the subscriber, or if it be desired to release the next call only after a certain interval of time, e. g. in a public call office, a form of mechanism such as that shown in Fig. 4 may be employed. The reading of the call charge register in each instance will show the amount chargeable against any person after using the telephone. In the mechanism of Fig. 4 a hand-operated two-armed spring-held lever 73 is mounted pivotally at 75 on the same support as the detent 54. The arm 74 has a pin 72 therein adapted to engage with the detent lever 54. The arm 76 of the lever has a pin 77 adapted to engage with a contact spring 78 movable into engagement with the member 79 to close the circuit 80 of the impulse contact of the selector of the automatic telephone. By this arrangement it is rendered impossible to obtain a telephonic connection except by previously applying to the person who controls the mechanism.

The invention in its broader aspects is not limited to the specific mechanisms shown and described but departures may be made therefrom within the scope of the accompanying claims without departing from the principles of the invention and without sacrificing its chief advantages.

What we claim is:

1. A mechanism adapted to register telephone call charges including in combination an electromagnet and an armature actuated by an impulse current in the magnet, a first register and gear connections from the armature to advance the register, a totalizing register, and mechanism for transferring accumulated values from the first register to the totalizing register including a spring device placed under tension as the first register is advanced by the magnet, a detent holding said spring under tension, and means for actuating said detent to release the spring after a predetermined advance of the first register to effect the transfer of the accumulated values from the first register to the totalizing register.

2. A mechanism adapted to register telephone call charges including in combination an electromagnet and an armature actuated by an impulse current in the magnet, a first register, a totalizing register, a planetary gear advanced by the armature, gear connections from said planetary gear to advance the first register, a spring device placed under tension by said planetary gear, and gear connections through said planetary gear from the spring device to said totalizing register, and means called into operation after a predetermined advance of the first register to release said spring device and to transfer the values from said first register to said totalizing register.

3. A mechanism adapted to register telephone call charges including in combination an electromagnet and an armature actuated by an impulse current in the magnet, a first register, a totalizing register, a wheel advanced by the armature, gear connections between said wheel and said registers, and acting to advance the first register step by step as the armature is actuated, a spring device placed under tension as the first register advances, gear connections to said totalizing register and detent means for holding same during the actuation of the first register, means operating after a predetermined advance of the first register for releasing said spring, and connections for transferring said predetermined first from the first register to the totalizing register and for returning the first register to zero.

4. A registering mechanism including in combination a first register, a totalizing register, means for actuating the first register including a magnet receiving current impulses and mechanism operated by said magnet to advance the first register, and means for transferring values from the first register to said totalizing register including a spring device put under tension by the operation of said first register and means for releasing the spring device and connections between said spring device and first register and totalizing register for transferring values to said totalizing register.

5. A registering mechanism including in combination a first register, a totalizing register, means for actuating the first register including a magnet receiving current impulses and mechanism operated by said magnet to advance the first register, and means for transferring values from the first register to said totalizing register including a spring device put under tension by the operation of said first register and means operating automatically on the first register reaching a predetermined limit for releasing the spring device and connections between said spring device and first register and totalizing register for transferring charges to said totalizing register.

6. A registering mechanism including in combination a first register, a totalizing register, means for actuating the first register including a magnet receiving current impulses and mechanism operated by said magnet to advance the first register, and means for transferring charges from the first register to said totalizing register including a spring device put under tension by the operation of said first register and means optionally manually operated for releasing the spring device and connections between said spring device and first register and totalizing register for transferring values to said totalizing register.

7. A registering mechanism including in combination a first register, a totalizing register, actuating mechanism including a magnet receiving current impulses and a planetary gear, gear connections from the planetary gear to the first register, gear connections from the planetary to the totalizing register, and means for holding said last-mentioned gear connections against rotation.

8. A registering mechanism including in combination a first register, a totalizing register, actuating means including a magnet receiving current impulses and a planetary gear, gear connections from the planetary gear to the first register, means placed under spring tension by the operation of the first register, gear connections from the planetary to the totalizing register, means for holding said last-mentioned gear connections against rotation and means for releasing said holding means to permit said spring-tensioned device to transfer a registered value from the first register to the totalizing register and for returning the first register to zero.

9. A registering mechanism including in combination a first register, a totalizing register, actuating means including a magnet receiving impulses and gear connections to said first register and said totalizing register, means placed under spring tension by the operation of the first register, means for holding the gear connections to the totalizing register against registration and means for releasing said holding means to permit said spring-tensioned device to transfer a registered value from the first register to the totalizing register and for returning the first register to zero.

10. A registering mechanism including in combination a first register, a totalizing register, means for actuating the first register including an electro-magnet and mechanism operated by said magnet to advance the first register, and means operating automatically upon the first register reaching a predetermined limit for transferring values from the first register to said totalizing register.

THÉODORE DIETRICH.
ONÉSIME BOREL.